United States Patent
Chan et al.

(10) Patent No.: US 10,908,925 B2
(45) Date of Patent: Feb. 2, 2021

(54) DYNAMIC LOADING METHOD, AND TARGET FILE CREATION METHOD AND APPARATUS

(71) Applicant: HUAWEI TECHNOLOGIES CO., LTD., Guangdong (CN)

(72) Inventors: Sun Chung Chan, Shenzhen (CN); Jisong Huang, Shenzhen (CN); Yanhui Huang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/877,827

(22) Filed: May 19, 2020

(65) Prior Publication Data
US 2020/0278875 A1 Sep. 3, 2020

Related U.S. Application Data

(63) Continuation of application No. PCT/CN2018/112220, filed on Oct. 26, 2018.

(30) Foreign Application Priority Data

Nov. 20, 2017 (CN) .......................... 2017 1 1160959

(51) Int. Cl.
*G06F 3/00* (2006.01)
*G06F 9/445* (2018.01)
*G06F 9/54* (2006.01)

(52) U.S. Cl.
CPC ...... *G06F 9/44521* (2013.01); *G06F 9/44505* (2013.01); *G06F 9/44578* (2013.01); *G06F 9/54* (2013.01)

(58) Field of Classification Search
CPC ....................................................... G06F 9/54
See application file for complete search history.

(56) References Cited

U.S. PATENT DOCUMENTS

| 6,708,330 | B1 | 3/2004 | Moberg et al. |
| 2008/0198746 | A1* | 8/2008 | Kwan ............ H04L 47/12 370/231 |
| 2015/0135200 | A1* | 5/2015 | Pajuelo Gonzalez ............ G06F 9/5077 719/328 |

FOREIGN PATENT DOCUMENTS

| CN | 101470619 A | 7/2009 |
| CN | 102147743 A | 8/2011 |

(Continued)

OTHER PUBLICATIONS

Song Yiqing, The Implementation of Dynamic Linking in Dynamic Binary Translation Systems. (Year: 2009).*

*Primary Examiner* — Lechi Truong

(57) ABSTRACT

The application provides a dynamic loading method, and a target file creation method and apparatus to save memory resources. The method includes: loading a dynamic link library file during a running process of an application program on a terminal device, where the dynamic link library file includes a symbol that can implement a functionality in the application program, and the symbol includes a function and/or a variable; reading a first index from a source file of the application program; determining, based on a global symbol table, a first symbol address corresponding to the first index, where the first symbol address is used for indicating a physical address of the symbol that can implement the functionality and invoking the symbol from the dynamic link library file according to the first symbol address, to complete running of the application program.

17 Claims, 10 Drawing Sheets

(56) References Cited

FOREIGN PATENT DOCUMENTS

| | | | |
|---|---|---|---|
| CN | 102819439 | A | 12/2012 |
| CN | 103744709 | A | 4/2014 |
| CN | 103970559 | A | 8/2014 |
| CN | 106325927 | A | 1/2017 |
| WO | 2011054223 | A1 | 5/2011 |

* cited by examiner

| Second array index | Module ID 1 |
|---|---|
| Second array index | Module ID 2 |
| ⋮ | ⋮ |
| First array index | First symbol address |
| First array index | First symbol address |
| First array index | First symbol address |
| ⋮ | ⋮ |

DYNAMIC LOADING METHOD, AND TARGET FILE CREATION METHOD AND APPARATUS

CROSS-REFERENCE TO RELATED APPLICATIONS

This application is a continuation of International Application No. PCT/CN2018/112220, filed on Oct. 26, 2018, which claims priority to Chinese Patent Application No. 201711160959.1, filed on Nov. 20, 2017. The disclosures of the aforementioned applications are hereby incorporated by reference in their entireties.

TECHNICAL FIELD

Example embodiments of the present invention relate to the field of dynamic loading of software, and in particular, to a dynamic loading method, and a target file creation method and apparatus.

BACKGROUND

With development of computer technologies, a terminal device has more functions. For a developer, addition of each function means addition of several application programs. Therefore, when writing code of an application program, the developer needs to consider whether service requirements of different application programs overlap. Code of an overlapped part may be usually compiled as one dynamic link library file. When being executed, an application program only needs to load the dynamic link library file. This process is a dynamic loading process. Therefore, by means of dynamic loading, the developer does not need to write same code in different programming tasks (such as application programs), in other words, one dynamic link library can serve a plurality of application programs, thereby greatly saving memory space of the terminal device.

Currently, when an application program on a terminal device is executed, a specific process of using a dynamic link library file is that, the terminal device searches a global symbol table for a symbol address based on a symbol name of an application program file. FIG. 1 is a schematic diagram of a global symbol table in the prior art. Then, the terminal device invokes a symbol from a loaded dynamic library according to the symbol address. During an actual operation process, a character string name in the global symbol table occupies a relatively large memory resource, and therefore the terminal device consumes a relatively large memory resource during the dynamic loading process.

SUMMARY

Embodiments of the present invention provide a dynamic loading method, and a target file creation method and apparatus, to resolve a technical problem that a current dynamic loading method consumes excessively more resources.

According to a first aspect, an embodiment of the present invention provides a dynamic loading method. The method may be described from a perspective of a terminal device. The terminal device may be a device such as a mobile phone or an iPad. The method includes: loading a dynamic link library file in a running process of an application program on a terminal device, where the dynamic link library file includes a symbol that can implement a particular function in the application program, and the symbol includes a function and/or a variable; reading a first array index from a source file of the application program; determining, in a global symbol table, a first symbol address corresponding to the first index, where the first symbol address is used for indicating a physical address of the symbol that can implement the particular function; and invoking the symbol from the dynamic link library file according to the first symbol address, to complete running of the application program.

In this embodiment of the present invention, the dynamic link library file includes the symbol that is needed by the application program during the running process. Therefore, when running the application program, the terminal device may load the dynamic link library file. The terminal device reads the first index from the source file of the application program, then determines, in the global symbol table, the first symbol address corresponding to the first index, and invokes the symbol from the dynamic link library file according to the first symbol address. The index occupies relatively few memory resources, thereby facilitating resource saving.

In a possible implementation, the loading, by the terminal device, a dynamic link library file includes: storing the dynamic link library file in a memory of the terminal device; reading the first index from st_name code in the dynamic link library file; determining, based on a mapping relationship between the first index and a second symbol address, the second symbol address corresponding to the first index, where the second symbol address is used for indicating a logical address of the symbol that can implement the particular function and that is in the dynamic link library file; relocating the second symbol address, to obtain the first symbol address; and filling the first symbol address in the dynamic link library file, to complete loading of the dynamic link library file.

In this embodiment of the present invention, when loading the dynamic link library file, the terminal device may read the first index in the dynamic link library file, then determine, based on the mapping relationship between the first index and the second symbol address, the second symbol address corresponding to the first index, then relocate the second symbol address, and fill the first symbol address in the dynamic link library file, to complete the loading of the dynamic link library file. Because the index occupies relatively few memory resources, the terminal device occupies relatively few memory resources when loading the dynamic link library file.

In a possible implementation, the determining, by the terminal device, in a global symbol table, a first symbol address corresponding to the first index includes: constructing the global symbol table, where the global symbol table includes a mapping relationship between the first index and the first symbol address; and determining, based on the mapping relationship between the first index and the first symbol address, the first symbol address corresponding to the first index.

In this embodiment of the present invention, the global symbol table includes the mapping relationship between the first index and the first symbol address. Because the index occupies the relatively few memory resources, the global symbol table occupies relatively few memory resources.

In a possible implementation, the determining, by the terminal device, in a global symbol table, a first symbol address corresponding to the first index includes: constructing the global symbol table, where the global symbol table includes the first symbol address, and the first symbol address is sorted in a particular sequence; and reading a first symbol address that is in the global symbol table and whose sequence number is the same as a value of the first index.

In this embodiment of the present invention, the global symbol table may include only the first symbol address, so that the global symbol table occupies fewer memory resources, thereby facilitating resource saving.

In a possible implementation, the determining, by the terminal device based on the mapping relationship between the first index and the first symbol address, the first symbol address corresponding to the first index includes: determining a functional module to which the first index belongs, where the functional module is configured to indicate a module that is in the dynamic link library file and that can implement the particular function; determining, in the global symbol table, a module symbol table corresponding to the functional module, where the module symbol table includes the mapping relationship between the first symbol address and the first index of the symbol in the functional module, and the symbol is used for indicating a function and/or a variable that is in the functional module and that is used for implementing the particular function; and reading, from the mapping relationship that is between the first symbol address and the first index and that is in the module symbol table, the first symbol address corresponding to the first index.

In this embodiment of the present invention, the global symbol table includes different module symbol tables. Each module symbol table includes a first symbol address of a symbol in a functional module corresponding to the module symbol table. The terminal device searches, for the first symbol address corresponding to the first index, the module symbol table corresponding to the functional module to which the first index belongs. Operations are convenient, and the index occupies the relatively few memory resources, thereby facilitating resource saving.

In a possible implementation, the determining, by the terminal device, a functional module to which the first index belongs includes: obtaining a second index associated with the first index; and determining, in a mapping relationship between a functional module and the second index, the functional module corresponding to the second index.

In this embodiment of the present invention, the terminal device may determine, based on the mapping relationship between the functional module and the second index, the functional module corresponding to the obtained second index. The index occupies the relatively few memory resources, thereby facilitating memory resource saving.

According to a second aspect, an embodiment of the present invention provides a target file creation method. The method may be described from a perspective of a target file creation apparatus. The target file creation apparatus may be any apparatus that has a capability of creating a target file, for example, a compile server. The method includes: determining a symbol name of a symbol included in source code of a target file, where the symbol is used for indicating a function or a variable that is in the source code and that can implement a particular function; determining, based on a mapping relationship between the symbol name and an array index, the index corresponding to the symbol name; and generating the target file based on the index.

In this embodiment of the present invention, during a target file creation process, the target file creation apparatus, such as the compile server, determines the index corresponding to the symbol name of the symbol included in the source code of the target file, and then generates the target file based on the index. For example, the symbol name originally stored in the target file is replaced with the index. In this manner, the target file includes the index corresponding to the symbol name of the symbol. The target file occupies relatively small space, thereby facilitating use of a terminal device.

In a possible implementation, the target file is a source file of a dynamic link library file and/or an application program.

In this embodiment of the present invention, the target file may further be another file. The foregoing several files are only examples. This is not specifically limited in embodiments of the present disclosure.

In a possible implementation, the generating, by the compile server, the target file based on the index includes: determining a location that is in the target file and that is used for storing the symbol name; and filling the index in the location.

In this embodiment of the present invention, the compile server fills, in the location for storing the symbol name, the index corresponding to the symbol name of the symbol, for the convenience of reading.

In a possible implementation, the location is located in an st_name code segment in the target file.

In this embodiment of the present invention, the compile server may further stores, at another location, the index corresponding to the symbol name of the symbol. This is not specifically limited in embodiments of the present disclosure.

According to a third aspect, an embodiment of the present invention provides a terminal device. The terminal device has functions of implementing the terminal device in the foregoing methods. These functions may be implemented by using hardware, or may be implemented by hardware performing corresponding software. The hardware or software includes one or more units corresponding to the foregoing functions.

In a possible implementation, a specific structure of the terminal device may include a loading module, a reading module, a determining module, and a symbol invocation module. These modules or units may perform a corresponding function in the method provided in any one of the first aspect or the possible implementation of the first aspect.

According to a fourth aspect, an embodiment of the present invention further provides a target file creation apparatus. The apparatus has functions of implementing the compile server in the foregoing methods. These functions may be implemented by using hardware, or may be implemented by hardware performing corresponding software. The hardware or software includes one or more units corresponding to the foregoing functions.

In a possible implementation, a specific structure of a three-dimensional modeling apparatus may include a determining module and a file generation module. These modules or units may perform a corresponding function in the method provided in any one of the second aspect or the possible implementation of the second aspect.

According to a fifth aspect, an embodiment of the present invention further provides a terminal device. The terminal device has functions of implementing the terminal device in the foregoing methods. These functions may be implemented by using hardware. The terminal device includes: a memory, configured to store computer executable program code; and a processor. The processor is coupled to the memory. The program code stored in the memory includes instructions. When the processor executes the instructions, the terminal device is enabled to perform the method performed by the terminal device in any one of the first aspect or the possible implementation of the first aspect.

According to a sixth aspect, an embodiment of the present invention further provides a target file creation apparatus. The target file creation apparatus has functions of implementing the compile server in the foregoing methods. These functions may be implemented by using hardware. The target file creation apparatus includes: a memory, configured to store computer executable program code; and a processor. The processor is coupled to the memory. The program code stored in the memory includes instructions. When the processor executes the instructions, the target file creation apparatus is enabled to perform the method performed by the compile server in any one of the second aspect or the possible implementation of the second aspect.

According to a seventh aspect, an embodiment of the present invention further provides a computer readable storage medium. The computer readable storage medium stores instructions, and when the instructions are run on a computer, the computer is enabled to perform the dynamic loading method in the first aspect.

According to an eighth aspect, an embodiment of the present invention further provides a computer readable storage medium. The computer readable storage medium stores instructions, and when the instructions are run on a computer, the computer is enabled to perform the target file creation method in the second aspect.

According to a ninth aspect, an embodiment of the present invention further provides a computer program product including instructions. When the instructions are run on a computer, the computer is enabled to perform the dynamic loading method in the first aspect.

According to a tenth aspect, an embodiment of the present invention further provides a computer program product including instructions. When the instructions are run on a computer, the computer is enabled to perform the target file creation method in the second aspect.

In the embodiments of the present invention, the dynamic link library file includes the symbol that is needed by the application program during the running process. Therefore, when running the application program, the terminal device may load the dynamic link library file, then read the first index from the source file of the application program, then determine, in the global symbol table, the first symbol address corresponding to the first index, and invoke the symbol from the dynamic link library file according to the first symbol address. The index occupies relatively few memories, thereby facilitating the resource saving.

DESCRIPTION OF EXAMPLE EMBODIMENTS

Figures 1, 2:
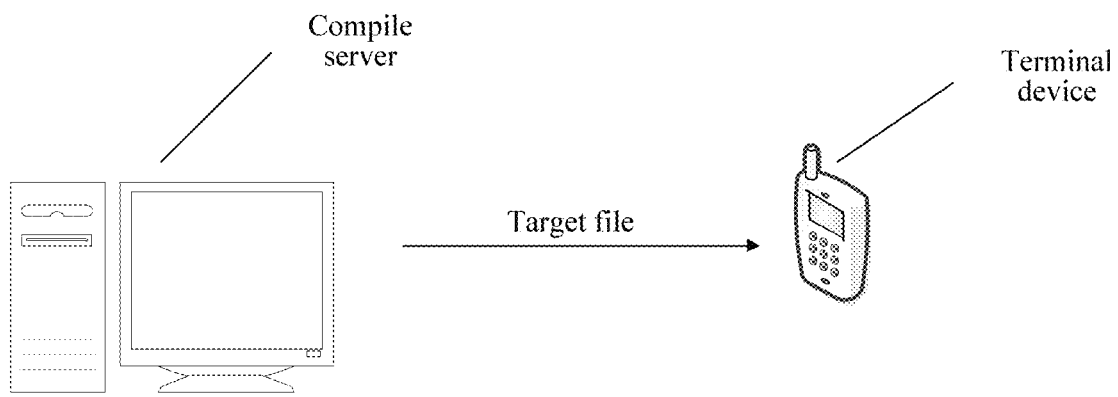
FIG. 1 is a schematic structural diagram of a global symbol table in the prior art.
FIG. 2 is a schematic diagram of an application scenario according to an embodiment of the present invention.

The following clearly describes the technical solutions provided in the embodiments of the present invention with reference to the accompanying drawings in the embodiments of the present invention.

The following explains some terms in the embodiments of the present invention, for easy understanding by a person skilled in the art.

(1) Target file: a file used for storing one or more symbols (or code). One target file usually includes a plurality of symbols. The symbols may be variables or functions. After loading the target file, a terminal device may run one of the symbols stored in the target file, to implement a particular function. There are relatively many types of target files, for example, a source file of an application program file, an executable and linkable format (ELF) file, a dynamic link library file, a redirectable file, a shared target file, and a core dump file.

(2) Dynamic link library file: a binary program file that is non-executable and that includes one or more symbols (code) and another resource that can be shared by a plurality of application programs of the terminal device. When being executed, an application program on the terminal device may invoke a corresponding symbol from a dynamic link library, to complete performing the application program. In Windows, the dynamic link library file is usually a .DLL file (whose file name extension is .DLL). In the Linux system, the dynamic link library file is usually a .so file (whose file name extension is .so). The dynamic link library file is usually stored in the C/System directory.

Use of the dynamic link library file can greatly reduce space occupied by the application program. In other words, a public symbol shared by a plurality of application programs may be stored in the dynamic link library file. When being executed, the application program may invoke the symbol from the dynamic link library file. Due to the use of the dynamic link library file, the application program is not excessively large.

(3) Symbol address: a storage address of a symbol. After determining the symbol address, the terminal device may load the symbol according to the symbol address, and load the target file.

The symbol address is usually classified into a logical address and an actual physical address. The logical address may be understood as a logical address defined for each symbol by a programmer during a programming process. The physical address is a real storage address of the symbol in a memory of the terminal device. When invoking the symbol, the application program on the terminal device usually uses the physical address of the symbol.

(4) Symbol name a name of the symbol. During programming, the symbol name is a variable name or a function name, and usually includes a letter, a digit, and an underline.

(5) Array index: An array is a set of a same type of data elements sequentially arranged. It may be alternatively understood that, a limited quantity of variables or functions of a same type are numbered. A sequence number of each variable or function may be referred to as an array label or an array index. The array index may be binary, decimal, or the like.

(6) Relocation: a process of converting the logical address of the symbol in the target file into the actual physical address in the memory, or may be understood as a process of modifying an instruction or data in the target file during loading of the target file. It is mentioned in the foregoing that, during a process of performing the application program, when the symbol is invoked, the physical address of the symbol is usually used. However, a symbol address (logical address) used by a compiling person during compiling of the symbol is not necessarily suitable for the actual physical address in the memory of the terminal device. Therefore, before the symbol is invoked, the symbol address needs to be relocated.

(7) The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In addition, in descriptions of the present invention, words such as "first" and "second" are used only for distinguishing the descriptions, but cannot be understood as indicating or implying relative importance, or cannot be understood as indicating or implying a sequence.

To better describe a dynamic loading method in an embodiment of the present invention, the following first describes an application scenario in this embodiment of the present invention. Refer to FIG. 2. As shown in FIG. 2, the application scenario provided in this embodiment of the present invention includes two parts. A first part is a compile server, and a second part is a terminal device. During an example operation process, the compile server may further be another server, as long as that the compile server is configured to compile code to generate a target file. The terminal device may be a mobile phone or a tablet computer.

The compile server is configured to compile and generate the target file. In other words, a compiling person compiles code by using the compile server, and generates the target file. A specific process is that, the compile server includes a compiling system, the compiling person inputs source code by using the compile server, the source code passes through the compiling system, and the target file is output. The terminal device is configured to load and run the target file generated by the compile server.

In this embodiment of the present invention, the target file may be a source file or a dynamic link library file in an application program file. Using a dynamic link library file as an example, after the compile server generates a dynamic link library, an application program on the terminal device may load the dynamic link library file when being executed. Currently, when the application program on the terminal device is executed, a specific process of using the dynamic link library file is that, the terminal device searches a global symbol table for a symbol address based on a symbol name of an application program file. FIG. 1 is a schematic diagram of a global symbol table in the prior art. Then, the terminal device invokes a symbol from a loaded dynamic library according to the symbol address. During an actual operation process, a character string name in the global symbol table occupies relatively more memory resources, and therefore the terminal device consumes relatively more memory resources during the dynamic loading process.

To resolve the technical problem, this embodiment of the present invention provides a dynamic loading method. In other words, the dynamic link library file is loaded during a running process of the application program on the terminal device, where the dynamic link library file includes a symbol that can implement a particular function in the application program, and the symbol includes a function and/or a variable; a first array index is read from a source file of the application program; a first symbol address corresponding to the first index is determined in a global symbol table, where the first symbol address is used for indicating a physical address of the symbol that can implement the particular function; and the symbol is invoked from the dynamic link library file according to the first symbol address, to complete running of the application program. In the method provided in this embodiment of the present invention, the index occupies relatively few memory resources, thereby facilitating memory resource saving.

Figure 3:
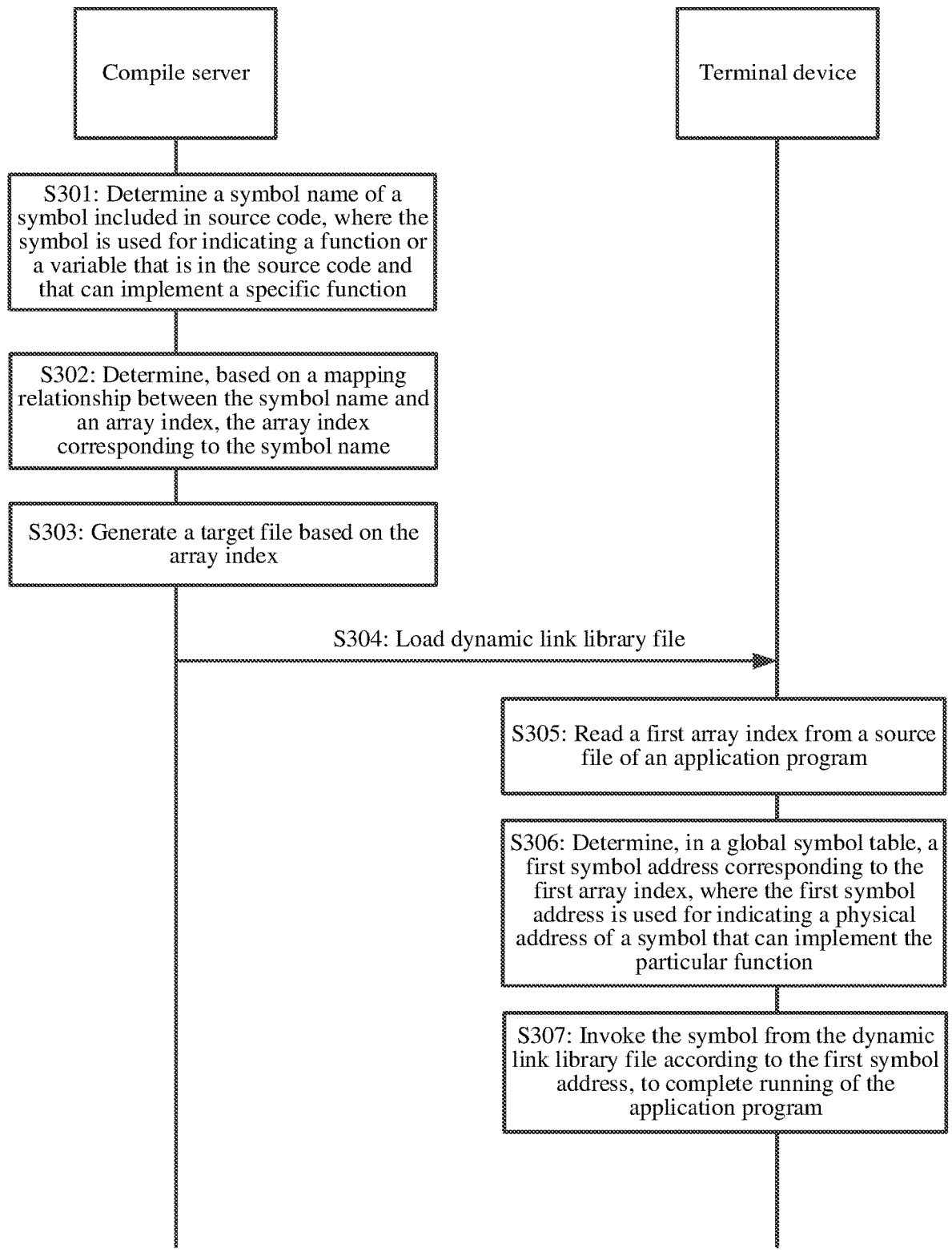
FIG. 3 is a flowchart of a target file loading method according to an embodiment of the present invention.

Before the dynamic loading method provided in this embodiment of the present invention is described, a process of creating the target file (a source file of the application program or the dynamic link library file) is first described. FIG. 3 is a flowchart of a target file loading method according to an embodiment of the present invention. Using the application scenario shown in FIG. 2 as an example, the method is applicable to the compile server in FIG. 2. Therefore, FIG. 3 may be alternatively understood as a schematic diagram of information exchange between the compile server and the terminal device in FIG. 2. A procedure of this method is described as follows.

S301: The compile server determines a symbol name of a symbol included in source code, where the symbol is used for indicating a function or a variable that is in the source code and that can implement a specific function.

It is already mentioned in the foregoing that, a compiling person inputs the source code by using the compile server. The source code includes a plurality of symbols and a symbol name of each symbol. The symbol herein may be a variable or a function, and the symbol name is a variable name or a function name.

For example, the source code input by the compiling person includes five functions, and the compile server determines that function names of the five functions are respectively fun1, fun2, fun3, fun4, and fun5.

S302: The compile server determines, based on a mapping relationship between the symbol name and an array index, the index corresponding to the symbol name.

In this embodiment of the present invention, the index may be binary, decimal, hexadecimal, or the like.

In an example, the compile server may store the mapping relationship between the symbol name and the array index in advance, and after determining the symbol name of the symbol included in the source code, the compile server may query the mapping relationship between the symbol name and the index for an index corresponding to each symbol name.

During an example operation process, after determining the symbol name of the symbol included in the source code, the compile server may alternatively sort a symbol name of each symbol directly. Then, the symbol name of each symbol corresponds to one sequence number. The sequence number (binary, decimal, or the like) may be used as the index.

S303: The compile server generates a target file based on the index.

During an actual operation process, when compiling the source code, the compiling person completes the compilation of the source code by compiling different code segments. The different code segments store different symbols (variables or functions), to implement different functions. Therefore, the compile server may directly fill the index in a to-be-generated target file after determining the index corresponding to each symbol name, or the compile server may directly fill the sequence number (binary, decimal, or the like) in a to-be-generated target file if sorting the symbol name of each symbol, to generate the target file.

In an example, an implementation in which the compile server fills the index in the target file may be that, the compile server determines a location that is in the to-be-generated target file and that is used for storing the symbol name, and then replaces the symbol name with the index, that is, fills the index in the location.

Figure 4:
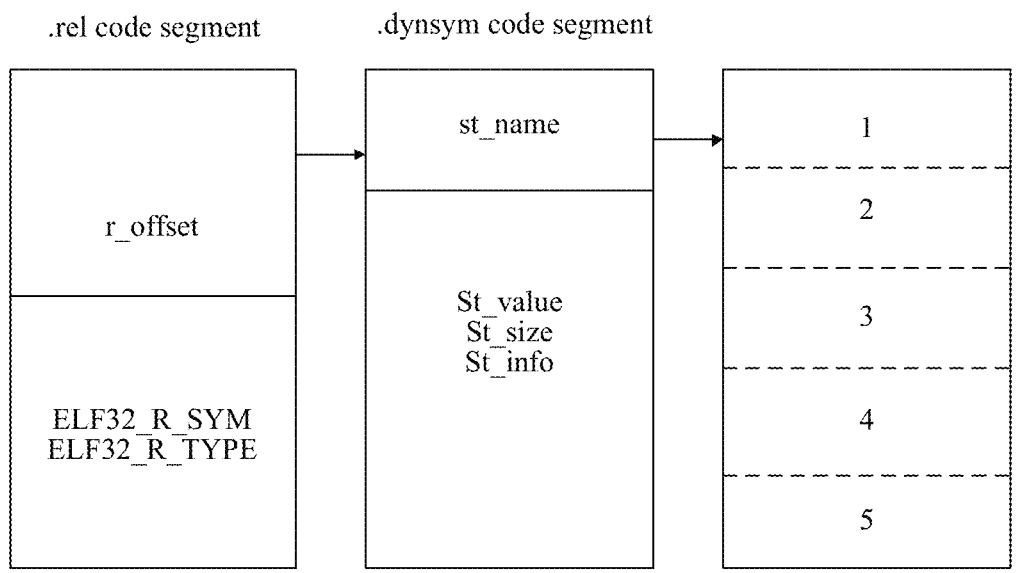
FIG. 4 is a schematic diagram of content stored in code segments in a target file according to an embodiment of the present invention.

Using an example in which the target file is a dynamic link library file that is a .so file, a location that is in the .so file and that is used for storing the symbol name is an st_name code segment in a dynsym code segment, and therefore, the compile server may fill the index in the st_name code segment. For example, symbol names determined by the compile server are respectively fun1, fun2, fun3, fun4, and fun5, and it is determined, based on the mapping relationship between the symbol name and the index, that indexes (decimal) respectively corresponding to fun1, fun2, fun3, fun4, and fun5 are 1, 2, 3, 4, and 5. Then, the compile server fills the indexes in the st_name code segment. Specifically, refer to FIG. 4. FIG. 4 shows code content stored in code segments in a .so file according to an embodiment of the present invention. As shown in FIG. 4, the .so file includes a .rel code segment, and the .rel code segment includes the .dynsym code segment. The st_name code segment in the dynsym code segment is used for storing an index. As shown in FIG. 4, the st_name code segment stores indexes, namely, 1 to 5, respectively corresponding to five symbols.

During an example operation process, the compile server may alternatively store the index at another location, or a code segment used for storing the index may be separately set. The index may be stored at any location, provided that the terminal device can read the index.

The dynamic link library file includes symbols used by an application program and symbol names of these symbols, a source file of the application program often includes the symbol names (or symbol pointers) of these symbols, and when the application program is run, the terminal device invokes, from the dynamic link library file, the symbols corresponding to the symbol names Therefore, in this embodiment of the present invention, when creating the dynamic link library file and the source file of the application program, the compile server may use the same mapping relationship between a symbol name and an index. In other words, an index in the created dynamic link library file corresponds to an index in the created source file of the application program.

If the target file may be the source file of the application program, when downloading the application program, the terminal device may load the source file of the application program into a memory of the terminal device, and execute the source file. The following provides descriptions by using an example in which the terminal device already loads the source file that is of the application program and that has been created by the compile server into the memory, and runs the application program, in other words, the terminal device completes a running process of the application program by using the dynamic link library file. Still referring to FIG. 3, the process of running, by the terminal device, the application program by using the dynamic link library file includes the following step:

S304: Load a dynamic link library file in a running process of an application program on a terminal device, where the dynamic link library file includes a symbol that can implement the particular function in the application program, and the symbol includes a function and/or a variable.

It is already mentioned in the foregoing that, the dynamic link library file includes the symbols used by the application program when the application program is executed. In other words, when the application program is executed, the dynamic link library file needs to be loaded. Therefore, when the application program on the terminal device is executed, the dynamic link library file may be first loaded into an operating system of the terminal device, for the application program to use. The following describes a process of loading the dynamic link library file by the terminal device.

In this embodiment of the present invention, the process of loading the dynamic link library file by the terminal device may be performed in five steps: First step: The terminal device stores the dynamic link library file in the memory of the terminal device. Second step: Read the first index from st_name code in the dynamic link library file. Third step: Determine, based on a mapping relationship between the first index and a second symbol address, the second symbol address corresponding to the first index, where the second symbol address is used for indicating a logical address of the symbol that can implement the particular function and that is in the dynamic link library file. Fourth step: Relocate the second symbol address, to obtain the first symbol address. Fifth step: Fill the first symbol address in the dynamic link library file, to complete loading of the dynamic link library file.

In the first step, the terminal device may download the dynamic link library file from the compile server, and stores the dynamic link library file in the memory of the terminal device. It is mentioned in the foregoing that, because the compile server fills the first index in the st_name code when creating the dynamic link library file, the terminal device only needs to read the first index in the second step. Third step, the terminal device loads the mapping relationship between the first index and the second symbol address, and determines, in the mapping relationship, the second symbol address corresponding to the first index. The second symbol address determined herein is a logical address.

It should be noted that, because the second symbol address is a logical address used for each symbol when the compiling person writes code, the logical address may be stored, and then the mapping relationship between the first index and the logical address (the second symbol address) may be established. A process of establishing the mapping relationship between the first index and the logical address may be performed by the terminal device. In another embodiment, to relieve pressure on the terminal device, the process may alternatively be performed by the compile server. If the process is performed by the compile server, the terminal device only needs to load the mapping relationship from the compile server in the third step.

Figure 5:
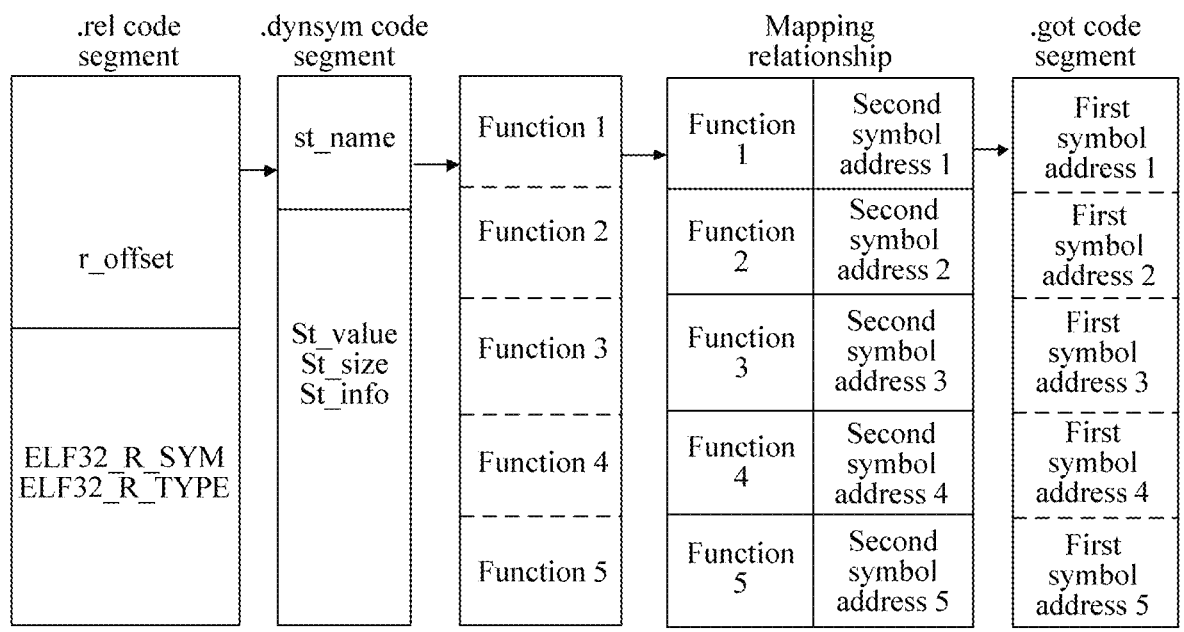
FIG. 5 is a schematic diagram of loading a dynamic link library file by a terminal device in the prior art.

FIG. 5 is a schematic diagram of loading a dynamic link library file by a terminal device in the prior art. In the prior art, during a process of generating the dynamic link library file, a compile server stores, in the dynamic link library file, a symbol name of each symbol, and constructs a mapping relationship between the symbol name and a second symbol address. Therefore, in FIG. 5, during a process of loading the dynamic link library file by the terminal device, after reading the symbol name of each symbol from the dynamic link library file, the terminal device determines, based on the mapping relationship between the symbol name and the second symbol address, the second symbol address corresponding to the symbol name Because a symbol name is usually a character string and occupies a relatively large memory resource, a relatively large memory resource is occupied during the loading of the dynamic link library file in the prior art.

Figures 6, 7:
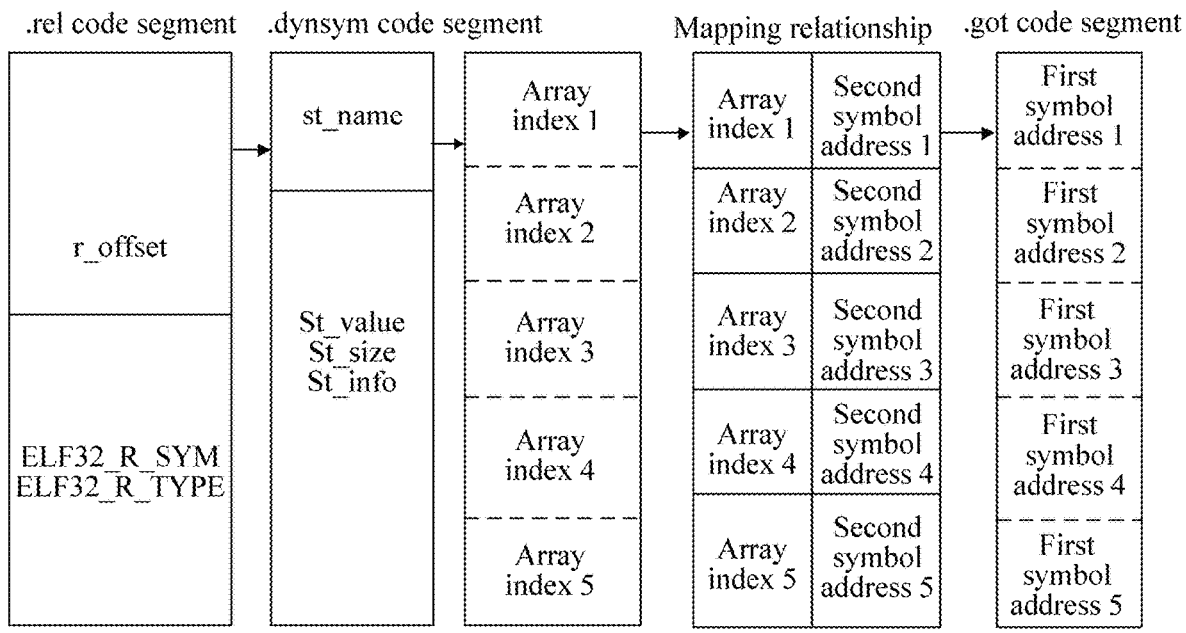
FIG. 6 is a schematic diagram of loading a dynamic link library file by a terminal device according to an embodiment of the present invention.
FIGS. 7, 8, 9, 10 and 11 are schematic structural diagrams of five global symbol tables respectively according to an embodiment of the present invention.

FIG. 6 is a schematic diagram of loading a dynamic link library file by a terminal device according to an embodiment of the present invention. It is already mentioned in the foregoing that, because during a process of creating the dynamic link library file, a compile server fills, in the dynamic link library file, an index corresponding to a symbol name, the compile server constructs a mapping relationship between the index and a second symbol address. Therefore, in FIG. 6, the terminal device reads five first indexes, respectively an index 1 to an index 5, from an st_name code segment in a .dynsym code segment in a .rel code segment in the dynamic link library file, and then determines, in the mapping relationship between the index and the second symbol address, a second symbol address corresponding to each index. Therefore, during a process of loading the dynamic link library file by the terminal device, relatively few memory resources are occupied, thereby relatively saving resources.

Because the second symbol address is a logical address, relocation needs to be performed on the second symbol address, that is, the fourth step. There may be a plurality of implementations for the fourth steps. For example, the terminal device may read relocation information from an r_info code segment in an .reldyn segment in an .rel code segment in the dynamic link library file. Then, the terminal device may relocate the second symbol address based on the relocation information. A relatively simple implementation process is that, the terminal device may add the relocation information (a symbol offset address) to the second symbol address, to obtain a symbol address after the relocation, namely, a first symbol address. During an alternative operation process, relocation may alternatively be performed on a symbol address in another manner. This is not specifically limited in embodiments of the present disclosure.

After the relocation is performed on the second symbol address, the fifth step may be performed, to be specific, the first symbol address after the relocation is filled in the dynamic link library file, to complete the loading of the dynamic link library file.

In an example, still referring to FIG. 6, in the fifth step, the terminal device may fill the symbol address after the relocation in a .got code segment indicated by r_offset in the .rel code segment, to complete the loading.

S305: The terminal device reads a first array index from a source file of the application program.

It is already described in the foregoing that, during a process of generating the source file of the application program, the compile server stores an index at a corresponding location in the source file. Therefore, the terminal device only needs to read the index at the corresponding location.

It is already mentioned in the foregoing that, when creating the dynamic link library file and the source file of the application program, the compile server may use the same mapping relationship between the symbol name and the index. In other words, an index in the created dynamic link library file corresponds to an index in the created source file of the application program. Therefore, the first index that is read from the source file of the application program by the terminal device in S305 represents a same symbol as that represented by a first index in the dynamic link library file.

S306: The terminal device determines, in a global symbol table, a first symbol address corresponding to the first index, where the first symbol address is used for indicating a physical address of the symbol that can implement the particular function.

Before S305, the terminal device needs to obtain the global symbol table. The following describes several implementations in which the terminal device obtains the global symbol table.

In a first implementation, it is already mentioned in the foregoing that, the compile server may establish the mapping relationship between the first index and the second symbol address (a logical address), and the first symbol address is obtained by relocating the second symbol address. Therefore, the terminal device may further establish a mapping relationship between the first index and the first symbol address, and the mapping relationship may be directly used as the global symbol table.

FIG. 7 is a schematic diagram of a first global symbol table according to an embodiment of the present invention. As shown in FIG. 7, the global symbol table includes a mapping relationship between a first index and a first symbol address. Because the index occupies relatively few memory resources, the global symbol table occupies relatively few resources, thereby relatively saving resources.

In a second implementation, after obtaining the first symbol address, the terminal device may directly sort all first symbol addresses in a particular sequence. The sorted first symbol addresses may be directly used as the global symbol table, in other words, a value of an index in the global symbol table is null, and includes only the first symbol addresses.

Figures 8, 9:
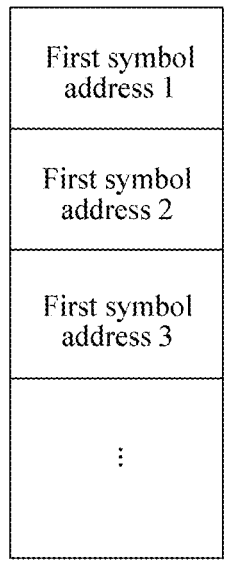

FIG. 8 is a schematic diagram of a second global symbol table according to an embodiment of the present invention. As shown in FIG. 8, the global symbol table includes only a first symbol address. In the second implementation, because the global symbol table includes only the first symbol address, the global symbol table occupies relatively few memory resources, thereby saving more resources.

In a third implementation, during an actual operation process, a dynamic link library file may include more than one functional module, and each functional module includes a plurality of symbols, to implement a particular function. The functional module herein may be understood as a subfile, or the like, in a dynamic link library, in other words, different functional modules may implement different functions. Therefore, when constructing the global symbol table, the terminal device may set a separate module symbol table for each functional module, and module symbol tables of all functional modules form the global symbol table.

In an example, when creating the dynamic link library file, a compile server may store, as a functional module as a whole, a symbol that can implement a particular function. Using an example in which the symbol is specifically a function, functions fun1 to fun3 are used for implementing a function, in other words, the three functions are stored as a whole in a file corresponding to the functional module.

Therefore, when constructing the global symbol table, the terminal device only needs to read, in a file corresponding to each functional module, a first index of a symbol included in the functional module. Therefore, to distinguish each functional module, when constructing the global symbol table, the terminal device may add a module identifier, such as a module ID, to each functional module, and then construct a module symbol table for each functional module, to obtain the global symbol table. Therefore, in this case, the global symbol table not only includes first symbol addresses of the symbols included in each functional module, and may further include the module ID of each functional module.

FIG. 9 is a schematic diagram of a third global symbol table according to an embodiment of the present invention. As shown in FIG. 9, the global symbol table includes a first symbol address and a module ID. Each first symbol address corresponds to one index, and each module ID also corresponds to one index. For differentiation, the first symbol address corresponds to a first index, and the module ID corresponds to a second index.

In a fourth implementation, the global symbol table not only includes a first symbol address of a symbol included in each functional module, but also may include a module ID of each functional module. All module IDs and first symbol addresses are sorted in a sequence. In other words, each module ID has a sequence number, and each first symbol address also has a sequence number.

Figure 10:
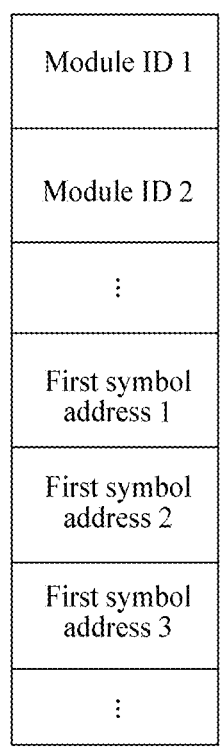

FIG. 10 is a schematic diagram of a fourth global symbol table according to an embodiment of the present invention. As shown in FIG. 10, first symbol addresses and module IDs in the global symbol table are sorted in a sequence.

In a fifth implementation, the global symbol table not only includes a symbol address of a symbol included in each functional module, but also may include a module ID of each functional module. Each module ID corresponds to one module symbol table, and each module symbol table includes symbol addresses of all symbols included in each module. For example, the global symbol table includes three module IDs. One of the module IDs is a module 0, and then a module symbol table corresponding to the module 0 includes symbol addresses of all symbols included in the module 0. Each symbol address starts with 0. To be specific, an index corresponding to a first symbol address may be 0x0001, and other subsequent symbol addresses in the module symbol table can be deduced by analogy.

Figure 11:
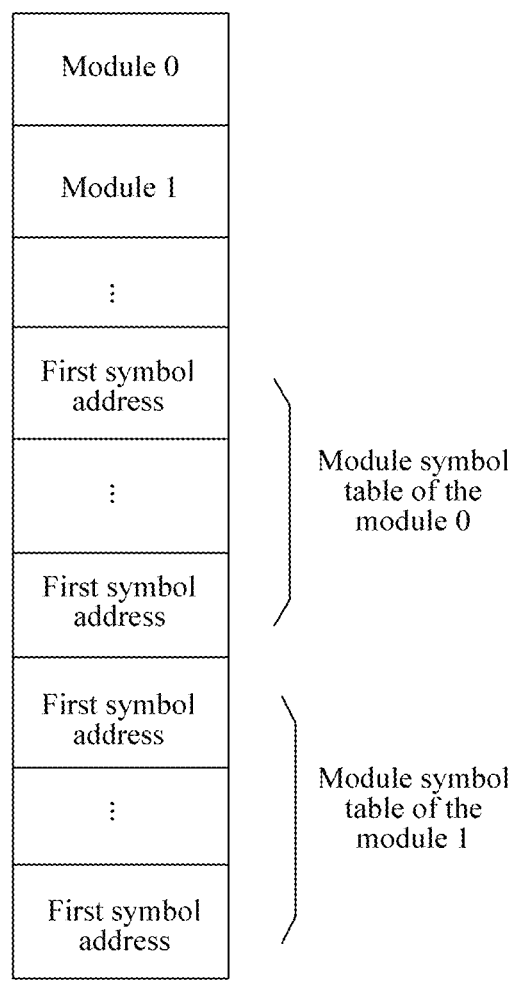

FIG. 11 is a schematic diagram of a fifth global symbol table according to an embodiment of the present invention. As shown in FIG. 11, the global symbol table includes two modules and a module symbol table corresponding to each module.

The foregoing only lists five possible implementations of global symbol tables. During an actual operation process, the foregoing five implementations may be used in combination. For example, in a global symbol table, some first symbol addresses or module IDs are sorted in a particular sequence, and each of some other first symbol addresses or module IDs corresponds to one index, provided that the index can uniquely identify the first symbol address or module ID.

The foregoing describes five implementations in which the terminal device constructs the global symbol table. After the terminal device constructs the global symbol table, S306 may be performed, to be specific, the terminal device determines, in the global symbol table, the first symbol address corresponding to the first index. Because the foregoing describes the five global symbol tables, the following describes different implementation processes of S306 for the different global symbol tables.

For the first implementation mentioned above, namely, the global symbol table shown in FIG. 7, the global symbol table includes the mapping relationship between the first index and the first symbol address. Therefore, after reading the first index from the source file of the application program, the terminal device may search the global symbol table for the first symbol address corresponding to the first index.

For the second implementation mentioned above, namely, the global symbol table shown in FIG. 8, all first symbol addresses in the global symbol table are sorted in a particular sequence. Therefore, each first symbol address corresponds to one sequence number. After the terminal device reads the first index from the source file of the application program, if a value of the first index is the same as a sequence number of a first symbol address, the terminal device determines that this first symbol address is a first symbol address corresponding to the first index.

For example, the terminal device reads five first indexes, namely, an index 1 to an index 5, from the source file of the application program, and values of the first indexes are respectively 1 to 5. Then, the terminal device determines, in the global symbol table, first symbol addresses whose sequence numbers are respectively 1 to 5, namely, addr1, addr2, addr3, addr4, and addr5.

For the third implementation mentioned above, namely, the global symbol table shown in FIG. 9, the global symbol table includes the first symbol address and the module ID. The first symbol address corresponds to the first index, and the module ID corresponds to the second index. If the first index and the second index are high-order bits and low-order bits in a same index, after reading the first index in the source file of the application program, the terminal device may determine the module ID based on a high-order part in the first index, and determine the first symbol address based on a low-order part in the first index.

Figure 12:
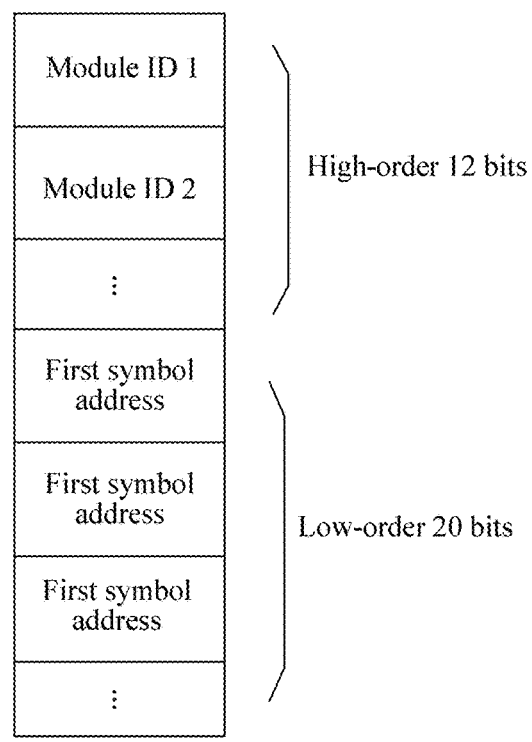
FIG. 12 is a schematic diagram of determining, in a global symbol table by a terminal device, a first symbol address according to an embodiment of the present invention.

For example, referring to FIG. 12, the first index read by the terminal device from the source file of the application program is a 32-bit integer, and the index may be divided into a high-order part and a low-order part, for example, high-order 12 bits and low-order 20 bits. The high-order 12 bits are used as a counting part of the module ID, and the low-order 20 bits are used as a counting part of the symbol address. In other words, the terminal device determines, in the global symbol table, the module ID based on the high-order 12 bits, and then determines, in the global symbol table, the first symbol address based on the low-order 20 bits. During an alternative operation process, the index may alternatively be 8 bits, 16 bits, or 64 bits, in other words, a bit width of the index may be determined based on an actual situation. Bit widths of the module ID and the first symbol address may also be determined based on an actual situation. This is not specifically limited in embodiments of the present disclosure.

If the first index and the second index are mutually independent, the terminal device may further read the second index from the source file of the application program, then determine, in the global symbol table, a module ID corresponding to the second index, and determine, in the global symbol table based on the read first index, the first symbol address corresponding to the first index.

For the fourth implementation mentioned above, namely, the global symbol table shown in FIG. 10, the global symbol table table includes the module IDs and the first symbol addresses, and the module IDs and the first symbol addresses are sorted in a sequence. In other words, each module ID corresponds to one sequence number, and each first symbol address corresponds to one sequence number. After reading the first index from the source file of the application program, the terminal device may determine, in the global symbol table, the first symbol address whose sequence number is the same as the value of the first index.

In an example, after reading the first index in the source file of the application program, the terminal device may determine the module ID based on a high-order part in the first index, and determine the first symbol address based on a low-order part in the first index. For example, the first index read by the terminal device is a 32-bit integer, and the index may be divided into a high-order part and a low-order part, for example, high-order 12 bits and low-order 20 bits. The terminal device may determine, in the global symbol table, a module ID whose sequence number is the same as a value of the high-order 12 bits, and determine, in the global symbol table, a first symbol address whose sequence number is the same as a value of the low-order 20 bits.

For the fifth implementation mentioned above, namely, the global symbol table shown in FIG. 11, the global symbol table not only includes the first symbol address of the symbol included in each functional module, but also may include the module ID of each functional module. Each module ID corresponds to the one module symbol table, and each module symbol table includes the first symbol addresses of all the symbols included in each module.

In an example, the first index read by the terminal device is a 32-bit integer, and the index may be divided into a high-order part and a low-order part, for example, high-order 12 bits and low-order 20 bits. The terminal device may determine, in the global symbol table, a module ID whose sequence number is the same as a value of the high-order 12 bits, and then may determine, in a module symbol table corresponding to the module ID, a first symbol address whose sequence number is the same as a value of the low-order 20 bits.

For any one of the foregoing structures of the global symbol table, when being performed, the application program on the terminal device may obtain the first symbol address from the global symbol table by using a dlsym function interface. In the prior art, the global symbol table includes the mapping relationship between a symbol address and a symbol name Therefore, a function interface used for obtaining the symbol address from the global symbol table is usually void* dlsym(void* handle, const char* symbol). Handle is a pointer returned after a target file is opened by using a dlopen function interface, and symbol is a symbol name of a symbol required to be obtained. A return value of the function is void*, and void* points to a symbol address (a function address) of the symbol and is to be invoked and used. In other words, in the prior art, the dlsym function needs to read the symbol name, and then return the symbol address corresponding to the symbol name. However, in embodiments of the present invention, because the global symbol table includes the mapping relationship between the index and the first symbol address, the dlsym function interface only needs to read the index, and return the first symbol address corresponding to the index.

In this embodiment of the present invention, the dynamic link library file may be used by a plurality of application programs, and different application programs may invoke different symbols in the dynamic link library file. Therefore, when an application program needs some symbols in the dynamic link library file, the terminal device may construct the global symbol table that includes a mapping relationship between first indexes and first symbol addresses of these symbols. When another application program needs some other symbols in the dynamic link library file, the terminal device may further supplement the global symbol table, to be specific, add a mapping relationship between first indexes and first symbol addresses of the some other symbols to the global symbol table.

S307: Invoke the symbol from the dynamic link library file according to the first symbol address, to complete running of the application program.

It is already mentioned in the foregoing that, the dynamic link library file stores the symbols used by the application program when the application program is executed. Therefore, after the terminal device determines that the first symbol address corresponding to the first index is a physical address, the terminal device determines a physical address of a symbol that is stored on the terminal device and that is in the dynamic link library file. Therefore, the terminal device may invoke the symbol in a dynamic link library file according to the first symbol address.

In this embodiment of the present invention, when needing the dynamic link library file, the terminal device may load the dynamic link library file by using the dlopen function interface. When the terminal device does not need the dynamic link library file, the terminal device may release the dynamic link library file and the global symbol table by using a dlclose function interface, to save a memory resource of the terminal device.

In summary, according to a target file creation method provided in this embodiment of the present invention, for example, the symbol name in the target file (the dynamic link library file or the source file in the application program) is replaced with the first index, to complete the creation of the target file. An embodiment of the present invention further provides a dynamic loading method. When running the application program, if the terminal device needs to use the symbol in the dynamic link library file, the terminal device loads the dynamic link library file, and constructs the global symbol table. The global symbol table includes the mapping relationship between the first index and the first symbol address. After reading the first index in the source file of the application program, the terminal device may determine, in the global symbol table, the first symbol address corresponding to the first index, and then invoke the symbol in the dynamic link library file according to the first symbol address, to complete the running of the application program. In this entire process, the terminal device completely uses the index, and the index occupies relatively few memory resources, thereby facilitating memory resource saving.

The following describes, with reference to the accompanying drawings, devices provided in embodiments of the present invention.

Figure 13:
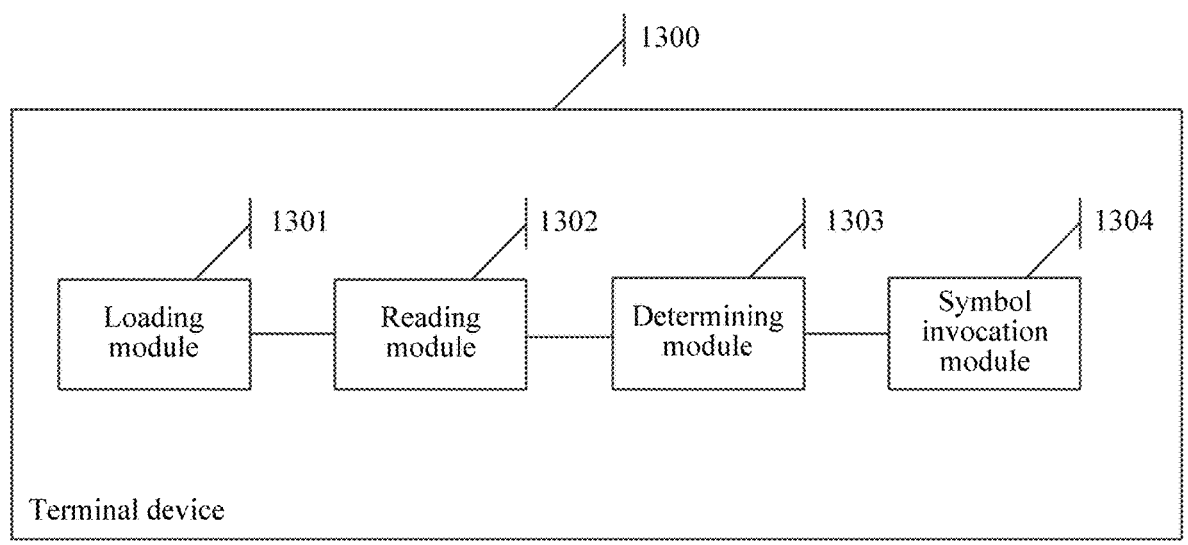
FIG. 13 is a schematic structural diagram of a terminal device according to an embodiment of the present invention.

FIG. 13 is a schematic structural diagram of a terminal device 1300. The terminal device 1300 may implement a function of the terminal device provided in the foregoing. The terminal device 1300 may include a loading module 1301, a reading module 1302, a determining module 1303, and a symbol invocation module 1304. The loading module 1301 may be configured to perform S304 in the embodiment shown in FIG. 3, and/or configured to support another process in the technology described in this document. The reading module 1302 may be configured to perform S305 in the embodiment shown in FIG. 3, and/or configured to support another process described in the present disclosure. The determining module 1303 may be configured to perform S306 in the embodiment shown in FIG. 3, and/or configured to support another process in the technology described in this document. The symbol invocation module 1304 may be configured to perform S307 in the embodiment shown in FIG. 3, and/or configured to support another process in the technology described in this document. All related content of the steps in the foregoing method embodiments may be cited in function descriptions of corresponding functional modules. Details are not described herein again.

It should be noted that, in this embodiment of the present invention, the terminal device is presented in a form of a functional unit. When being unrestricted, the term "unit" used in this document may refer to an application-specific integrated circuit (ASIC), an electronic circuit, a (shared, dedicated, or group) processor and memory, or a combinatorial logic circuit that executes one or more software or firmware programs, and/or another suitable part that provides the function.

Figure 14:
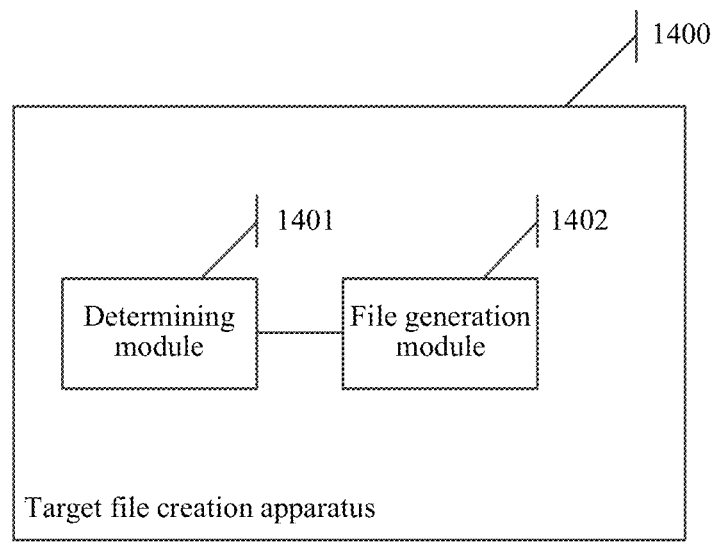
FIG. 14 is a schematic structural diagram of a target file creation apparatus according to an embodiment of the present invention.

FIG. 14 is a schematic structural diagram of a target file creation apparatus 1400. The target file creation apparatus 1400 may implement a function of the compile server provided in the foregoing. The target file creation apparatus 1400 may include a determining module 1401 and a file generation module 1402. The compile server module 1401 may be configured to perform S301 and S302 in the embodiment shown in FIG. 3, and/or configured to support another process described in the present disclosure. The file generation module 1402 may be configured to perform S303 in the embodiment shown in FIG. 3, and/or configured to support another process described in the present disclosure. All related content of the steps in the foregoing method embodiments may be cited in function descriptions of corresponding functional modules. Details are not described herein again.

It should be noted that, in embodiments of the present invention, the target file creation apparatus is presented in a form of a functional unit. When being unrestricted, the term "unit" used in this document may refer to an application-specific integrated circuit (ASIC), an electronic circuit, a (shared, dedicated, or group) processor and memory, or a combinatorial logic circuit that executes one or more software or firmware programs, and/or another suitable part that provides the function.

Figure 15:
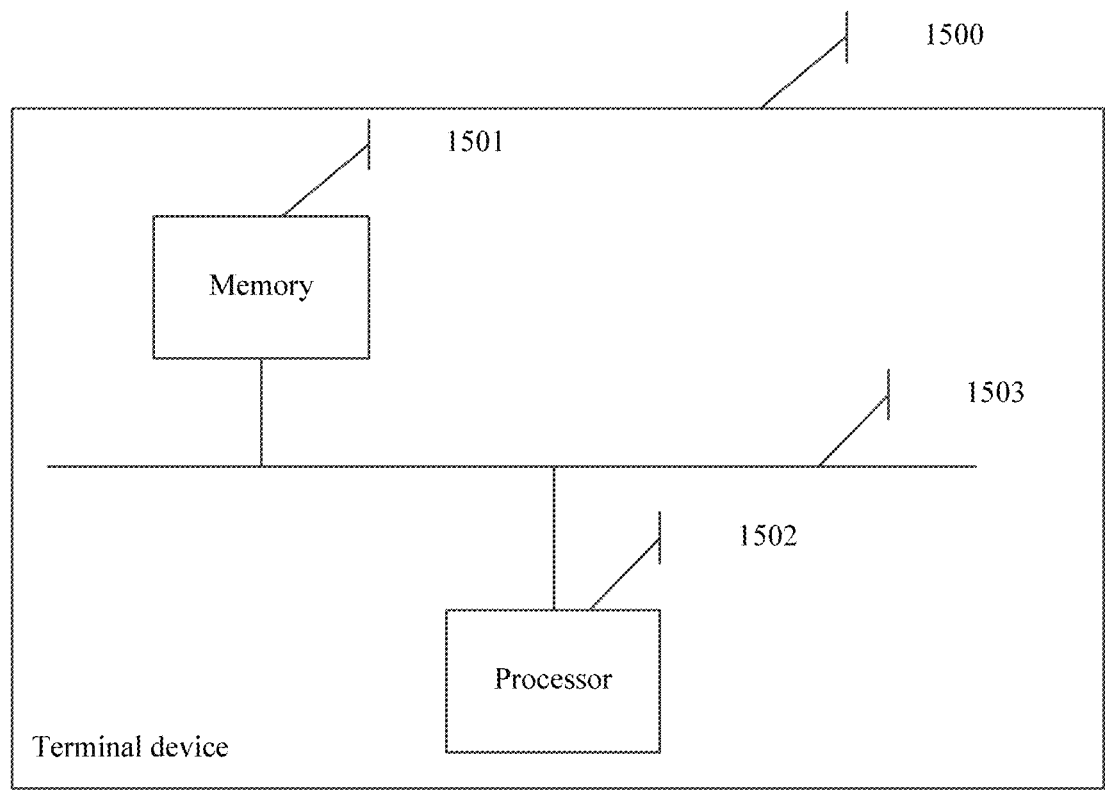
FIG. 15 is a schematic structural diagram of another terminal device according to an embodiment of the present invention.

In a simple embodiment, a person skilled in the art may think that, the terminal device shown in FIG. 13 may be further implemented by using the structure shown in FIG. 15.

As shown in FIG. 15, the terminal device 1500 may include: a memory 1501, a processor 1502, and a bus 1503. The memory 1501 may be connected to the processor 1502 by using the bus 1503. The memory 1501 is configured to store computer executable instructions. When the terminal device 1500 is run, the processor 1502 executes the computer executable instructions stored in the memory 1501, so that the terminal device 1500 performs the dynamic loading method provided in the embodiment shown in FIG. 3. For the specific dynamic loading method, refer to related descriptions in the foregoing and the accompanying drawings. Details are not described herein again.

In this embodiment of the present invention, the processor 1502 may be a field-programmable gate array (FPGA), an application-specific integrated circuit (ASIC), a system on chip (SoC), a central processor unit (CPU), a network processor (NP), a digital signal processor (DSP), or a micro controller unit (MCU), or may be a programmable logic device (PLD) or another integrated chip. The bus 1503 may be a peripheral component interconnect (PCI) bus, an Extended Industry Standard Architecture (EISA) bus, or the like. The bus 1503 may be classified into an address bus, a data bus, a control bus, and the like. For ease of representation, only one thick line is used to represent the bus in FIG. 15, but this does not mean that there is only one bus or only one type of bus.

Figure 16:
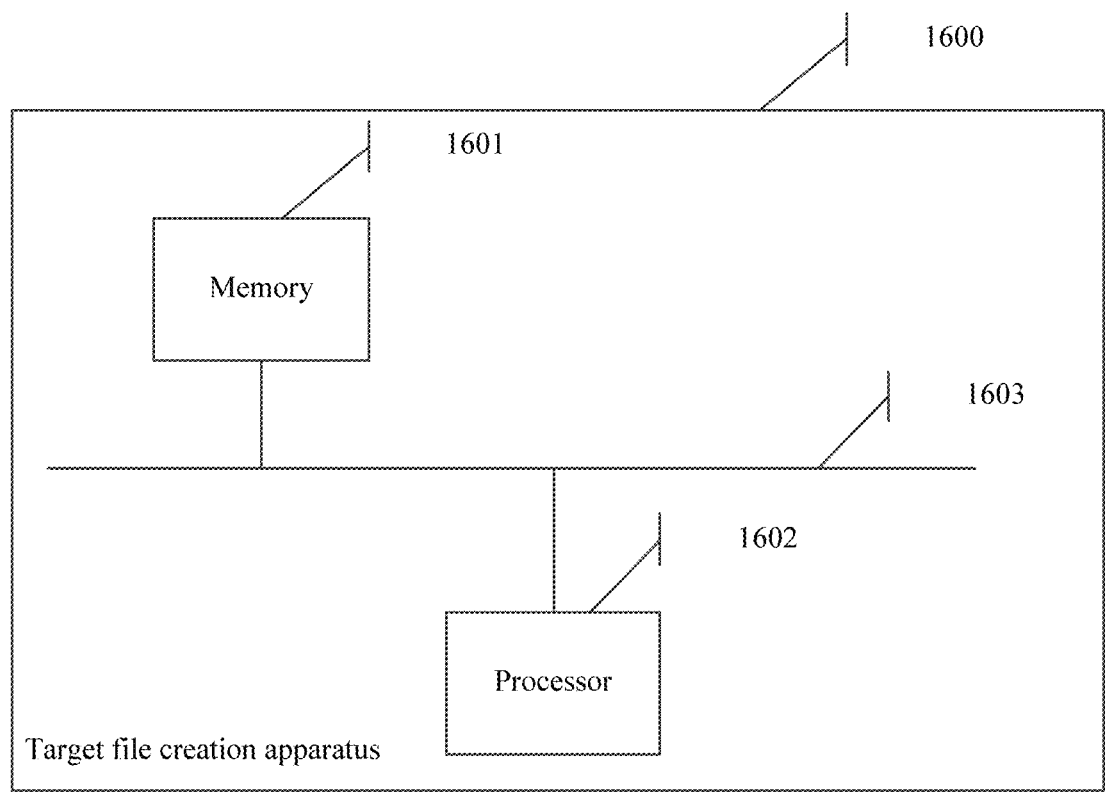
FIG. 16 is a schematic structural diagram of another target file creation apparatus according to an embodiment of the present invention.

In a simple embodiment, a person skilled in the art may think that, the target file creation apparatus shown in FIG. 14 may be further implemented by using the structure shown in FIG. 16.

As shown in FIG. 16, the target file creation apparatus 1600 may include: a memory 1601, a processor 1602, and a bus 1603. The memory 1601 may be connected to the processor 1602 by using the bus 1603. The memory 1601 is configured to store computer executable instructions. When the target file creation apparatus 1600 is run, the processor 1602 executes the computer executable instructions stored in the memory 1601, so that the target file creation apparatus 1600 performs the dynamic loading method provided in the embodiment shown in FIG. 3. For the specific dynamic loading method, refer to related descriptions in the foregoing and the accompanying drawings. Details are not described herein again.

In this embodiment of the present invention, the processor 1602 may be a field-programmable gate array (FPGA), an application-specific integrated circuit (ASIC), a system on chip (SoC), a central processor unit (CPU), a network processor (NP), a digital signal processor (DSP), or a micro controller unit (MCU), or may be a programmable logic device (PLD) or another integrated chip. The bus 1603 may be a peripheral component interconnect (PCI) bus, an Extended Industry Standard Architecture (EISA) bus, or the like. The bus 1603 may be classified into an address bus, a data bus, a control bus, and the like. For ease of representation, only one thick line is used to represent the bus in FIG. 16, but this does not mean that there is only one bus or only one type of bus.

In summary, according to a target file creation method provided in this embodiment of the present invention, for example, the symbol name in the target file (the dynamic link library file or the source file in the application program) is replaced with the first index, to complete the creation of the target file. An embodiment of the present invention further provides a dynamic loading method. When running the application program, if the terminal device needs to use the symbol in the dynamic link library file, the terminal device loads the dynamic link library file, and constructs the global symbol table. The global symbol table includes the mapping relationship between the first index and the first symbol address. After reading the first index in the source file of the application program, the terminal device may determine, in the global symbol table, the first symbol address corresponding to the first index, and then invoke the symbol in the dynamic link library file according to the first symbol address, to complete the running of the application program. In this entire process, the terminal device completely uses the index, and the index occupies relatively few memory resources, thereby facilitating memory resource saving.

All or some of the foregoing embodiments of the present invention may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a Solid State Disk (SSD)), or the like.

The foregoing embodiments are merely used to describe the technical solutions of the embodiments of the present invention. The foregoing embodiments are merely intended to help understand the method and core ideas of the embodiments of the present invention, and shall not be construed as a limitation on this application. Any variation or replacement readily figured out by a person skilled in the art within the technical scope disclosed in the embodiments of the present invention shall fall within the protection scope of the present invention.

What is claimed is:

1. A dynamic loading method, comprising:
   loading a dynamic link library file during a running process of an application program on a terminal device, wherein the dynamic link library file comprises a symbol that can implement a functionality in the application program, and the symbol comprises at least one of a function or a variable;
   reading a first index from a source file of the application program;
   determining, from a global symbol table, a first symbol address corresponding to the first index, wherein the first symbol address is indicative of a physical address of the symbol; and
   invoking the symbol from the dynamic link library file according to the first symbol address, to complete running of the application program,
   wherein the loading of the dynamic link library file comprises:
     storing the dynamic link library file in a memory of the terminal device;
     reading the first index from the dynamic link library file;
     determining, based on a mapping relationship between the first index and a second symbol address, the second symbol address corresponding to the first index, wherein the second symbol address is indicative of a logical address of the symbol;
     relocating the second symbol address, to obtain the first symbol address; and
     filling the first symbol address in the dynamic link library file, to complete the loading of the dynamic link library file.

2. The method according to claim 1, wherein the determining, from a global symbol table, a first symbol address corresponding to the first index comprises:
   constructing the global symbol table, wherein the global symbol table comprises a mapping relationship between the first index and the first symbol address; and
   determining, based on the mapping relationship between the first index and the first symbol address, the first symbol address corresponding to the first index.

3. The method according to claim 2, wherein the determining, based on the mapping relationship between the first index and the first symbol address, the first symbol address corresponding to the first index comprises:
   determining a functional module to which the first index belongs, wherein the functional module indicates a module that is in the dynamic link library file and that can implement the functionality;
   determining, from the global symbol table, a module symbol table corresponding to the functional module, wherein the module symbol table comprises the mapping relationship between the first symbol address and the first index, and the symbol is indicative of a function or a variable that is in the functional module and that implements the functionality; and
   reading, from the mapping relationship between the first symbol address and the first index, the first symbol address corresponding to the first index.

4. The method according to claim 3, the determining a functional module to which the first index belongs comprises:
   obtaining a second index associated with the first index; and
   determining, based on a mapping relationship between a functional module and the second index, the functional module corresponding to the second index.

5. The method according to claim 1, wherein the determining, from a global symbol table, a first symbol address corresponding to the first index comprises:
   constructing the global symbol table, wherein the global symbol table comprises a plurality of first symbol addresses including the first symbol address, and the plurality of first symbol addresses are sorted in a sequence; and
   reading the first symbol address from the global symbol table, a sequence number of the first symbol address among the plurality of first symbol addresses corresponding to the first index.

6. The method according to claim 1, wherein the first index is read from st_name code in the dynamic link library file.

7. A terminal device, comprising: at least one processor and a memory;
   wherein the memory is configured to store computer executable instructions for execution by the at least one processor, and the at least one processor is configured to:
   load a dynamic link library file during a running process of an application program on the terminal device, wherein the dynamic link library file comprises a symbol that can implement a functionality in the application program, and the symbol comprises at least one of a function or a variable;
   read a first index from a source file of the application program;
   determine, from a global symbol table, a first symbol address corresponding to the first index, wherein the first symbol address is indicative of a physical address of the symbol; and invoke the symbol from the dynamic link library file according to the first symbol address, to complete running of the application program, wherein when loading the dynamic link library file, the at least one processor is configured to:
store the dynamic link library file in the memory of the terminal device;
read the first index from the dynamic link library file;
determine, based on a mapping relationship between the first index and a second symbol address, the second symbol address corresponding to the first index, wherein the second symbol address is indicative of a logical address of the symbol;
relocate the second symbol address, to obtain the first symbol address; and
fill the first symbol address in the dynamic link library file, to complete loading of the dynamic link library file.

8. The terminal device according to claim 7, wherein when determining, from the global symbol table, the first symbol address corresponding to the first index, the at least one processor is further configured to:
construct the global symbol table, wherein the global symbol table comprises a mapping relationship between the first index and the first symbol address; and
determine, based on the mapping relationship between the first index and the first symbol address, the first symbol address corresponding to the first index.

9. The terminal device according to claim 8, wherein when determining, based on the mapping relationship between the first index and the first symbol address, the first symbol address corresponding to the first index, the at least one processor is further configured to:
determine a functional module to which the first index belongs, wherein the functional module indicates a module that is in the dynamic link library file and that can implement the functionality;
determine, from the global symbol table, a module symbol table corresponding to the functional module, wherein the module symbol table comprises the mapping relationship between the first symbol address and the first index, and the symbol is indicative of a function or a variable that is in the functional module and that implements the functionality; and
read, from the mapping relationship between the first symbol address and the first index, the first symbol address corresponding to the first index.

10. The terminal device according to claim 9, wherein when determining the functional module to which the first index belongs, the at least one processor is further configured to:
obtain a second index associated with the first index; and
determine, based on a mapping relationship between a functional module and the second index, the functional module corresponding to the second index.

11. The terminal device according to claim 7, wherein when determining, from the global symbol table, the first symbol address corresponding to the first index, the at least one processor is further configured to:
construct the global symbol table, wherein the global symbol table comprises a plurality of first symbol addresses including the first symbol address, and the plurality of first symbol addresses are sorted in a sequence; and
read the first symbol address from the global symbol table, a sequence number of the first symbol address among the plurality of first symbol addresses corresponding to the first index.

12. The terminal device according to claim 7, wherein the first index is read from st_name code in the dynamic link library file.

13. A non-transitory computer readable storage medium, comprising instructions, that when executed by a computer, enable the computer to perform functions comprising:
loading a dynamic link library file during a running process of an application program on a terminal device, wherein the dynamic link library file comprises a symbol that can implement a functionality in the application program, and the symbol comprises at least one of a function or a variable;
reading a first index from a source file of the application program;
determining, from a global symbol table, a first symbol address corresponding to the first index, wherein the first symbol address is indicative of a physical address of the symbol; and
invoking the symbol from the dynamic link library file according to the first symbol address, to complete running of the application program,
wherein the loading of the dynamic link library file comprises:
storing the dynamic link library file in a memory of the terminal device;
reading the first index from the dynamic link library file;
determining, based on a mapping relationship between the first index and a second symbol address, the second symbol address corresponding to the first index, wherein the second symbol address is indicative of a logical address of the symbol;
relocating the second symbol address, to obtain the first symbol address; and
filling the first symbol address in the dynamic link library file, to complete the loading of the dynamic link library file.

14. The non-transitory computer readable storage medium according to claim 13, wherein the determining, from a global symbol table, a first symbol address corresponding to the first index comprises:
constructing the global symbol table, wherein the global symbol table comprises a mapping relationship between the first index and the first symbol address; and
determining, based on the mapping relationship between the first index and the first symbol address, the first symbol address corresponding to the first index.

15. The non-transitory computer readable storage medium according to claim 14, wherein the determining, based on the mapping relationship between the first index and the first symbol address, the first symbol address corresponding to the first index comprises:
determining a functional module to which the first index belongs, wherein the functional module indicates a module that is in the dynamic link library file and that can implement the functionality;
determining, from the global symbol table, a module symbol table corresponding to the functional module, wherein the module symbol table comprises the mapping relationship between the first symbol address and the first index, and the symbol is indicative of a function or a variable that is in the functional module and that implements the functionality; and reading, from the mapping relationship between the first symbol address and the first index, the first symbol address corresponding to the first index.

16. The non-transitory computer readable storage medium according to claim 15, the determining a functional module to which the first index belongs comprises:
obtaining a second index associated with the first index; and
determining, based on a mapping relationship between a functional module and the second index, the functional module corresponding to the second index.

17. The non-transitory computer readable storage medium according to claim 13, wherein the determining, from a global symbol table, a first symbol address corresponding to the first index comprises:
constructing the global symbol table, wherein the global symbol table comprises a plurality of first symbol addresses including the first symbol address, and the plurality of first symbol addresses are sorted in a sequence; and
reading the first symbol address from the global symbol table, a sequence number of the first symbol address among the plurality of first symbol addresses corresponding to the first index.

* * * * *

UNITED STATES PATENT AND TRADEMARK OFFICE
CERTIFICATE OF CORRECTION

PATENT NO.          : 10,908,925 B2                                               Page 1 of 1
APPLICATION NO.     : 16/877827
DATED               : February 2, 2021
INVENTOR(S)         : Chan et al.

It is certified that error appears in the above-identified patent and that said Letters Patent is hereby corrected as shown below:

In the Claims

In Claim 13, at Column 22, Line 6, "Anon-transitory" should be -- A non-transitory --.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*